United States Patent
Orlando

[19]

[11] Patent Number: 6,158,210
[45] Date of Patent: Dec. 12, 2000

[54] GEAR DRIVEN BOOSTER

[75] Inventor: Robert J. Orlando, West Chester, Ohio

[73] Assignee: General Electric Company, Cincinnati, Ohio

[21] Appl. No.: 09/204,877

[22] Filed: Dec. 3, 1998

[51] Int. Cl.[7] .................................................. F02K 3/04
[52] U.S. Cl. ..................... 60/226.1; 415/173.7; 29/889.2
[58] Field of Search .................... 60/226.1, 262; 415/170.1, 174.2, 173.7; 29/889.7, 889.21, 889.22

[56] References Cited

U.S. PATENT DOCUMENTS

| | | | |
|---|---|---|---|
| 4,251,987 | 2/1981 | Adanson | 60/226.1 |
| 4,463,956 | 8/1984 | Malott | 415/175 |
| 4,578,942 | 4/1986 | Weiler | 60/39.32 |
| 4,827,712 | 5/1989 | Coplin | 60/226.1 |
| 4,914,904 | 4/1990 | Parnes et al. | 60/226.1 |
| 4,947,642 | 8/1990 | Grieb et al. | 60/226.1 |
| 5,010,729 | 4/1991 | Adamson et al. | 60/226.1 |
| 5,867,979 | 2/1999 | Newton et al. | 60/226.1 |

Primary Examiner—Charles G. Freay
Attorney, Agent, or Firm—Andrew C. Hess; Nathan D. Herkamp

[57] ABSTRACT

A turbine engine includes a gear driven booster connected to a high pressure shaft of the engine. A gear assembly connects the booster to the high pressure shaft. The booster is a high speed orthogonal booster that includes a plurality of rotor blades and a plurality of stator vanes. The booster rotates in a direction that is opposite to a direction the high pressure shaft rotates.

19 Claims, 4 Drawing Sheets

6,158,210

GEAR DRIVEN BOOSTER

BACKGROUND OF THE INVENTION

This invention relates generally to turbine engines and, more particularly, to a gear driven booster for a turbine engine.

Turbine engines typically include a high pressure shaft and a low pressure shaft. The high pressure shaft connects a high pressure compressor to a high pressure turbine. The low pressure shaft connects a low pressure compressor, or booster, to a low pressure turbine. The booster is located upstream from the high pressure compressor which is located upstream from the high pressure turbine. The low pressure turbine is located downstream from the high pressure turbine. A combustor is between the high pressure compressor and the high pressure turbine. Further, a fan may be connected to the low pressure shaft upstream of the booster.

One way to generate additional thrust in a turbine engine is to increase the rotational speed of the low pressure shaft, thereby increasing the speed of the fan, booster, and low pressure turbine, which increases engine flow and pressure ratio. Another way to generate additional thrust is to either increase fan flow or increase fan pressure ratio, or both, at the same rotational speed of the low pressure shaft. Normally, increased thrust is obtained in conjunction with an increase in inlet temperature to the high pressure turbine and the low pressure turbine. The increased thrust, also normally results in additional horse power transmitted by the low pressure turbine to the booster and fan by the low pressure shaft.

Increased thrust therefore is normally obtained with additional complexities and costs associated with increased turbine temperatures such as more expensive materials, having to cool additional low pressure turbine stages, and increased power being transmitted by the low pressure turbine shaft.

Accordingly, it would be desirable to provide a turbine engine configuration that generates increased thrust, while utilizing existing low pressure shaft technology. In addition, it would be desirable for the engine to generate increased thrust without the need for cooling any of the low pressure turbine stages.

BRIEF SUMMARY OF THE INVENTION

These and other objects may be attained by a turbine engine including a gear driven booster coupled to a high pressure shaft. The high pressure shaft also couples a high pressure compressor and a high pressure turbine. The turbine engine also includes a low pressure shaft which couples a fan and a low pressure turbine.

The booster includes a plurality of rotor blades, a plurality of stator vanes, and a booster shaft having a first portion and a second portion. The first booster shaft portion is connected to the rotor blades and the second booster shaft portion is connected to a first gear assembly. In one embodiment, the booster shaft rotates in a direction opposite the direction of rotation of the high pressure shaft.

The booster, which is driven through the first gear assembly, will now rotate at a higher speed thereby reducing the number of booster stages required to impart the required pressure rise. Preliminary estimates indicate that a four stage booster could be replaced by a two stage gear driven booster. Also, since the low pressure turbine is required to produce less power, a corresponding reduction in the number of low pressure turbine stages also occurs. Preliminary estimates indicate that a five stage low pressure turbine could be replaced by a four stage low pressure turbine.

The booster in an engine with a gear connected to the high pressure shaft will be located downstream of the main frame. The main frame strut will then be more directly lined up with the main fan bearing. This may result in reducing the weight of the main frame.

The booster in this type of engine normally requires about 20% of the low pressure turbine power output and the fan normally requires about 80% of the low pressure turbine power output. Thus, driving just the booster solely through the gear results in a smaller gear and therefore lower gear losses than if the gear is utilized to drive the fan.

The engine also includes an accessories drive having a second gear assembly that includes a first gear member and a second gear member. The second gear member is connected to the high pressure shaft and rotates therewith.

The gear driven booster receives its input power from the high pressure shaft and utilizes its output power to drive a high speed booster. Typically, two stage high pressure turbines are lightly loaded and are capable of generating enough power to drive a gear driven booster. The gear driven booster enables the high pressure turbine to generate more power and lowers the low pressure turbine inlet temperature and low pressure turbine shaft power requirements. In addition, the torque on the low pressure shaft is reduced since the load on the low pressure turbine is reduced.

DETAILED DESCRIPTION OF THE INVENTION

Figure 1:
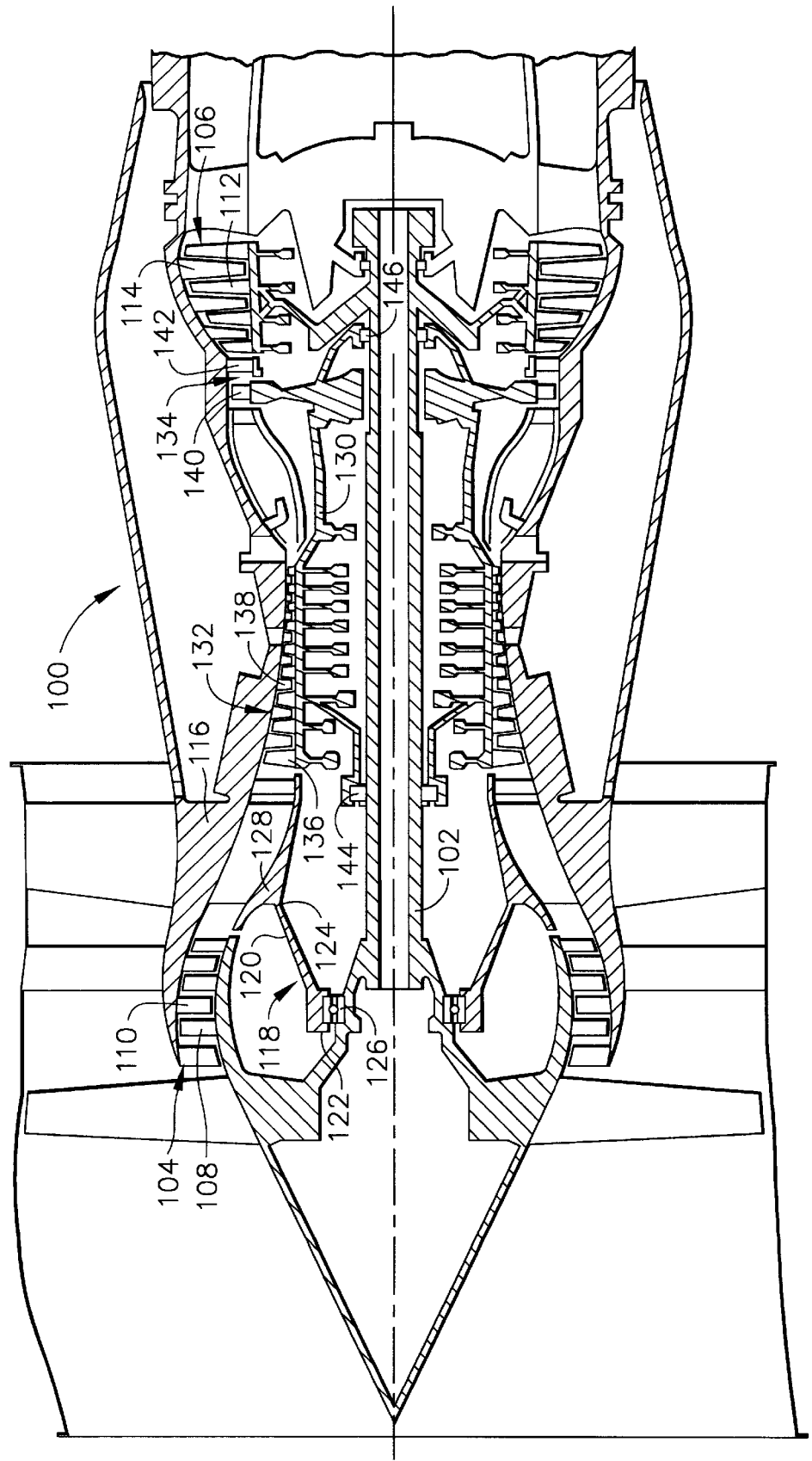
FIG. 1 is a schematic view of a gas turbine engine known in the art.

FIG. 1 is a schematic view of a known gas turbine engine 100 including a low pressure shaft 102 attached to a booster 104 and a low pressure turbine 106. Booster 104 includes a plurality of rotor blades 108 and a plurality of stator vanes 110. Low pressure turbine 106 also includes a plurality of rotor blades 112 and a plurality of stator vanes 114. Stator vanes 110, 114 are connected to a frame 116 of engine 100. Rotor blades 108, 112 are connected to low pressure shaft 102 so that when low pressure turbine rotor blades 112 rotate, booster rotor blades 108 also rotate.

A number one bearing support cone 118 supports rotor blades 108 and low pressure shaft 102. Bearing support cone 118 includes a number one bearing support arm 120 with a first end 122 and a second end 124. First end 122 is connected to a number one ball bearing 126 that contacts low pressure shaft 102. Second end 124 is connected to a fan frame hub 128. Bearing support arm 120 supports low pressure shaft 102 both axially and radially.

Engine 100 also includes a high pressure shaft 130 attached to a high pressure compressor 132 and a high pressure turbine 134. High pressure compressor 132 includes a plurality of rotor blades 136 and a plurality of stator vanes 138. High pressure turbine 134 also includes a plurality of rotor blades 140 and a plurality of stator vanes 142. Stator vanes 138, 142 are connected to frame 116 of engine 100. Rotor blades 136, 140 are connected to high pressure shaft 130 so that when high pressure turbine rotor blades 140 rotate, high pressure compressor rotor blades 136 also rotate.

High pressure shaft 130 and low pressure shaft 102 are substantially concentric, with high pressure shaft 130 located on an exterior side of low pressure shaft 102. High pressure shaft 130 includes bearings 144, 146 that contact low pressure shaft 102 and allow high pressure shaft 130 to rotate freely with respect to low pressure shaft 102.

Figure 2:
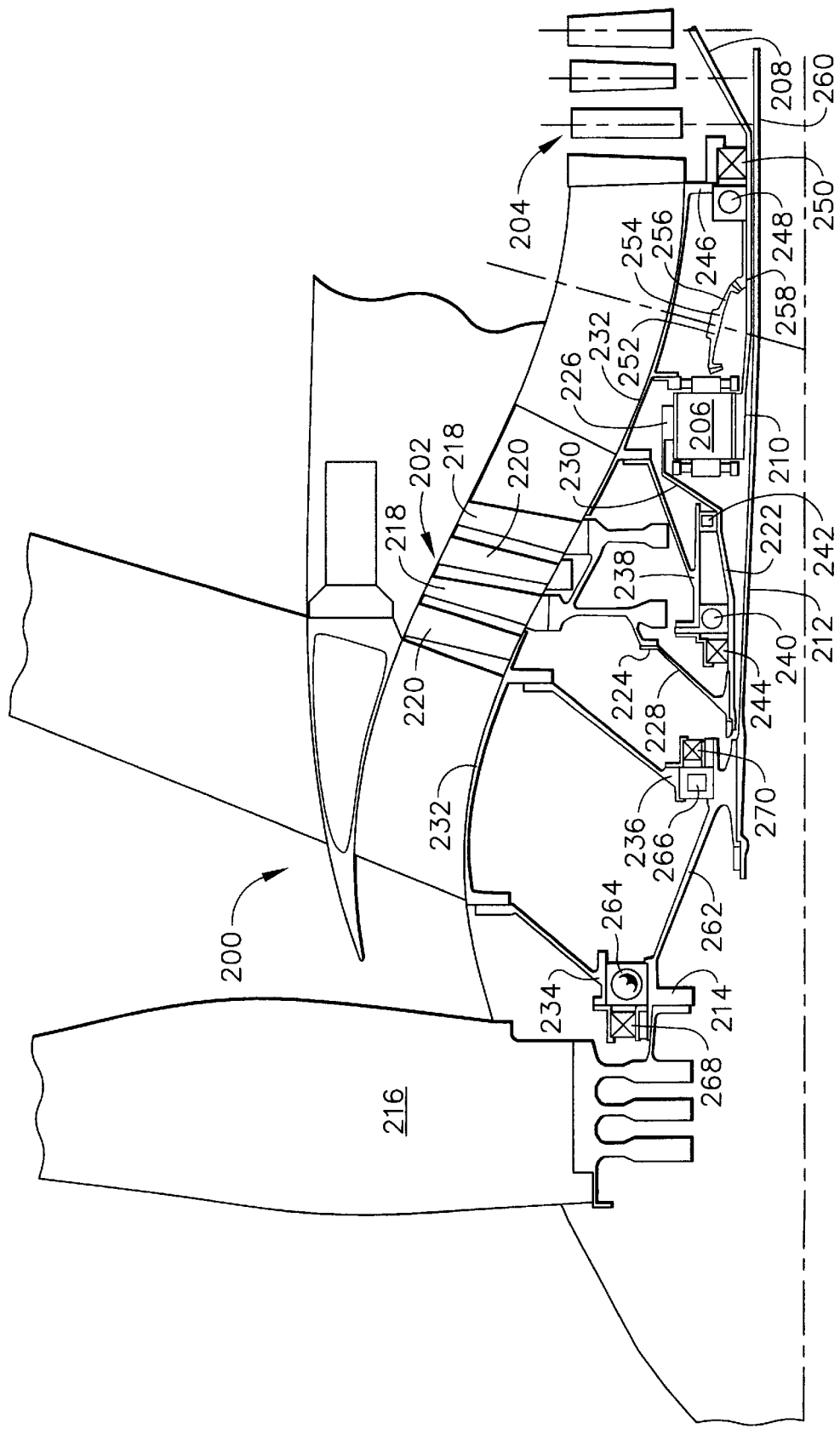
FIG. 2 is a schematic view of a gas turbine engine incorporating a gear driven booster.

FIG. 2 is a schematic view of a turbine engine 200 including a booster 202 connected to a high pressure compressor 204 via a gear assembly 206. Turbine engine 200 also includes a high pressure shaft 208 having a first end (not shown) and a second end 210. The first end of high pressure shaft 208 is connected to a high pressure turbine (not shown) and second end 210 is connected to gear assembly 206. High pressure compressor 204 is also connected to high pressure shaft 208. Turbine engine 200 further includes a low pressure shaft 212 having a first end (not shown) and a second end 214. The first end of low pressure shaft 212 is connected to a low pressure turbine (not shown) and low pressure shaft second end 214 is connected to a fan 216.

Booster 202, in one embodiment, is a high speed orthogonal booster and includes a plurality of rotor blades 218, a plurality of stator vanes 220, and a booster shaft 222 having a first end 224 and a second end 226. Booster shaft first end 224 is connected to booster 202 and booster shaft second end 226 is connected to gear assembly 206. Booster shaft 222 also includes a first portion 228 and a second portion 230. First portion 228 is connected to rotor blades 218 and second portion 230 is connected to gear assembly 206 as explained below in detail. First portion 228 is connected to second portion 230 by a spline connection. Alternatively, first portion 228 could be connected to second portion 230 by welding or other type of fixed connection.

In one embodiment, booster shaft 222 rotates in a direction opposite the direction of rotation of high pressure shaft 208. In another embodiment, booster shaft 222 rotates in the same direction as the rotation of high pressure shaft 208. Booster 202 rotates, in one embodiment, at about half of the speed of high pressure shaft 208. For example, if high pressure shaft rotates at about 11,000 revolutions per minute (RPM), booster 202 would rotate at about 5,500 RPM.

Turbine engine 200 also includes a fan frame hub 232 that includes a first support cone 234, a second support cone 236, and a third support cone 238. Third support cone 238 supports booster shaft 222 and includes a 3A bearing 240 and a 3B bearing 242. In one embodiment, bearing 240 is a ball bearing and bearing 242 is a roller bearing. Bearing 240 is located upstream of bearing 242 which is located upstream of gear assembly 206. A first seal 244 contacts third support cone 238 and booster shaft 222 and is located upstream of bearings 240 and 242.

Fan frame hub 232 further includes an extension 246 extending towards high pressure shaft 208. A bearing 248 is connected to extension 246 and contacts high pressure shaft 208. Bearing 248 is located downstream of gear assembly 206. In one embodiment, bearing 248 is a ball bearing. A second seal 250 extends between extension 246 and high pressure shaft 208 and is located downstream of bearing 248. First seal 244 and second seal 250 provide a sealed environment for gear assembly 206 and bearings 240, 242, and 248 and permit oil to be supplied to gear assembly 206 and bearings 240, 242, and 248 while preventing oil from entering booster 202 and high pressure compressor 204.

Turbine engine 200 also includes an accessories drive 252 utilized during engine start-up and during normal operation. Accessories drive 252 includes a gear assembly 254 having a first gear member 256 and a second gear member 258. Second gear member 258 is connected to high pressure shaft 208 and rotates therewith, and first gear member 256 intermeshes with second gear member 258. In one embodiment, gear assembly 254 is located downstream of gear assembly 206 and upstream of seal 250. Alternatively, gear assembly 254 could be connected to gear assembly 206 and could be located immediately upstream of gear assembly 206. A plurality of oil ducts (not shown) supply oil to gear assemblies 206 and 254 as is well known in the art.

Low pressure shaft 212 includes a first portion 260 and a second portion 262. First portion 260 extends from the low pressure turbine. Second portion 262 extends from fan 216. First portion 260 and second portion 262 are connected by a spline connection. Alternatively, first portion 260 and second portion 262 could be connected by welding or other fixed connection.

First support cone 234 is connected to a number one bearing 264 that contacts second portion 262 of low pressure shaft 212. First support cone 234 provides axial and radial support for low pressure shaft 212. Second support cone 236 is connected to a number two bearing 266 that contacts second portion 262 of low pressure shaft 212. Bearing 266 is located downstream of bearing 264. In one embodiment, bearing 264 is a ball bearing and bearing 266 is a roller bearing. A seal 268 is positioned upstream of bearing 264 and another seal 270 is positioned downstream of bearing 266. Seals 268 and 270 provide an oil seal surrounding bearings 264 and 266 and prevent oil from entering booster 202.

In an alternate embodiment, gear driven booster 202 could be driven by a low pressure shaft and the gear assembly could increase the rotational speed of the booster relative to the rotational speed of the low pressure shaft.

Gear driven booster 202 can be used to increase the power extraction of a lightly loaded high pressure turbine. Driving booster 202 off high pressure shaft 208 results in lowering the gas temperature in the low pressure turbine and reducing the horsepower requirements on low pressure shaft 212. The inclusion of gear driven booster 202 in a turbine engine may also result in increased thrust ratings with the utilization of existing cores thereby eliminating the large costs associated with developing an all new core. A core is normally defined to include the high pressure compressor, the combustor, and the high pressure turbine.

Figure 3:
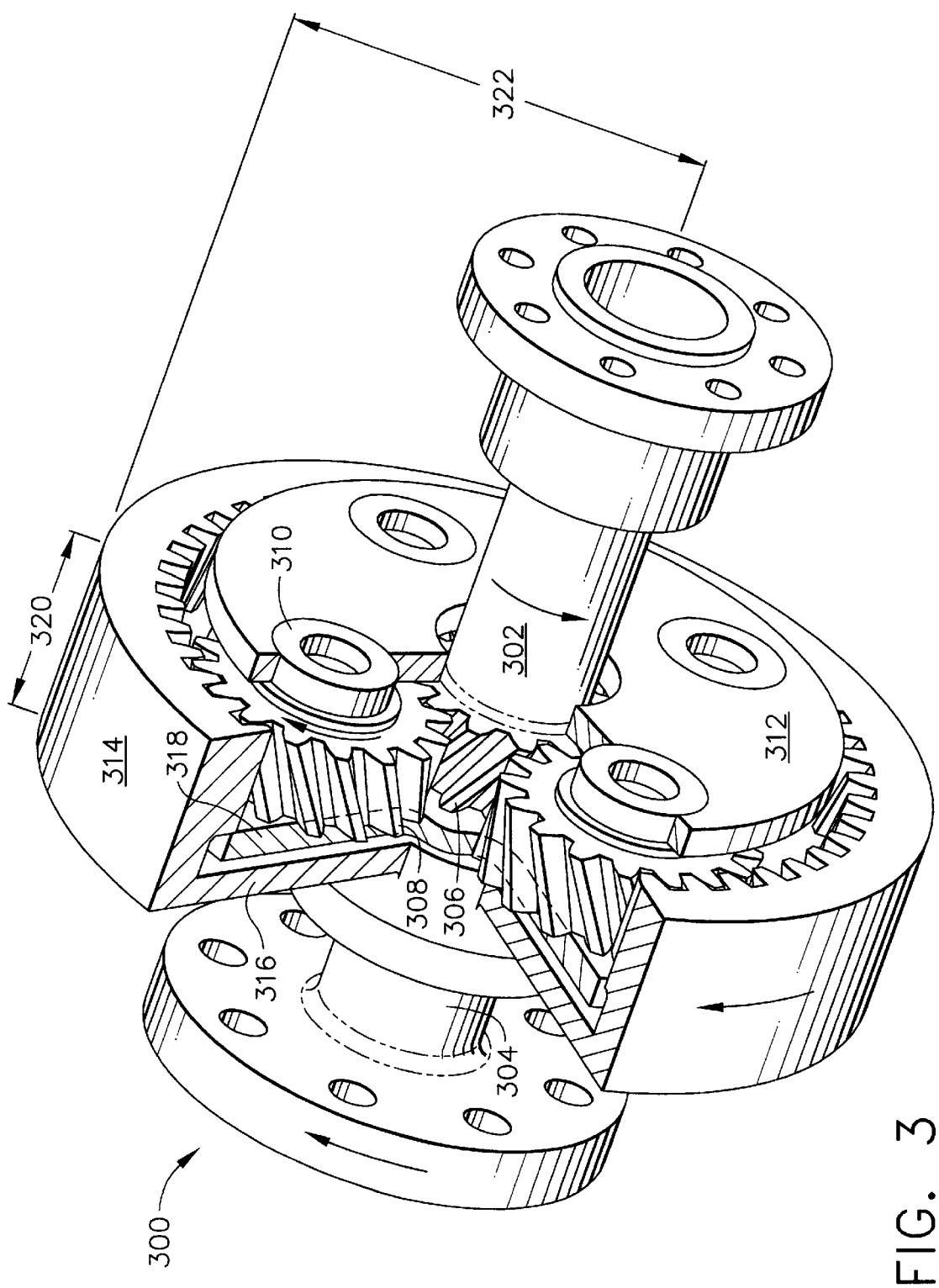
FIG. 3 is a schematic view of a star drive gear system.

FIG. 3 illustrates a gear assembly 300 that could be used, for example, in connection with turbine engine 200 (i.e., as gear assembly 206). Gear assembly 300 is a star drive gear assembly that includes a first shaft 302 and a second shaft 304. Shaft 302 rotates counter to the rotation of shaft 304. For example, shaft 302 rotates counter-clockwise and shaft 304 rotates clockwise.

First shaft 302 is a high speed shaft and could be connected to a high pressure shaft (not shown) in the turbine engine. Shaft 302 is also connected to a sun gear 306. Sun gear 306 is in contact with a plurality of planetary gears 308 that are substantially uniformly spaced around gear 306. Planetary gears 308 include a spindle 310 that extends from a center of gears 308.

Gear assembly 300 also includes a static carrier 312 that encircles shaft 302 and spindles 310. Static carrier 312 is fixedly connected to a frame (not shown) of the turbine engine such that static carrier 312 does not rotate. Static carrier 312 thus fixes spindles 310 in a predetermined orientation and does not permit them to move with respect to the turbine engine frame. Planetary gears 308 rotate in an opposite direction from the rotation of sun gear 306.

Gear assembly 300 further includes an annulus gear, or ring, 314 that is in contact with planetary gears 308. In addition, annulus gear 314 is fixedly connected to second shaft 304 by an extension member 316. Annulus ring 314 rotates in the same direction as planetary gears 308 and thus second shaft 304 rotates in the same direction as planetary gears 308. A ledge, or step 318 extends from first shaft 302 and is located between planetary gears 308 and extension member 316. Second shaft 304 is a low speed shaft and could be connected to a booster shaft in the turbine engine. Alternatively shaft 304 could be connected to a low pressure compressor shaft.

Gear assembly 300 can achieve output ratios in the range from about 2:1 to about 11:1. The range can be varied by altering the size of annulus ring 314 and the size of sun gear 306. In addition, the number and size of planetary gears 308 in gear assembly 300 will vary depending on the desired ratio.

In an exemplary embodiment, sun gear 306 has a pitch circle diameter of about 7.86 inches and annulus gear 314 has a pitch circle diameter of about 16.4 inches. Seven planetary gears, each having a pitch circle diameter of about 4.27 inches, contact sun gear 306 and annulus gear 314. Gear assembly 300 has a facewidth 320 of about 2.75 inches and a diametral pitch 322 of about 7.5 inches. Gear assembly 300 with seven planetary gears 308 can have an output ratio of about 2:1. For example, if shaft 302 is rotating at about 11,000 RPM, then shaft 304 will be rotating at about 5,500 RPM.

Figure 4:
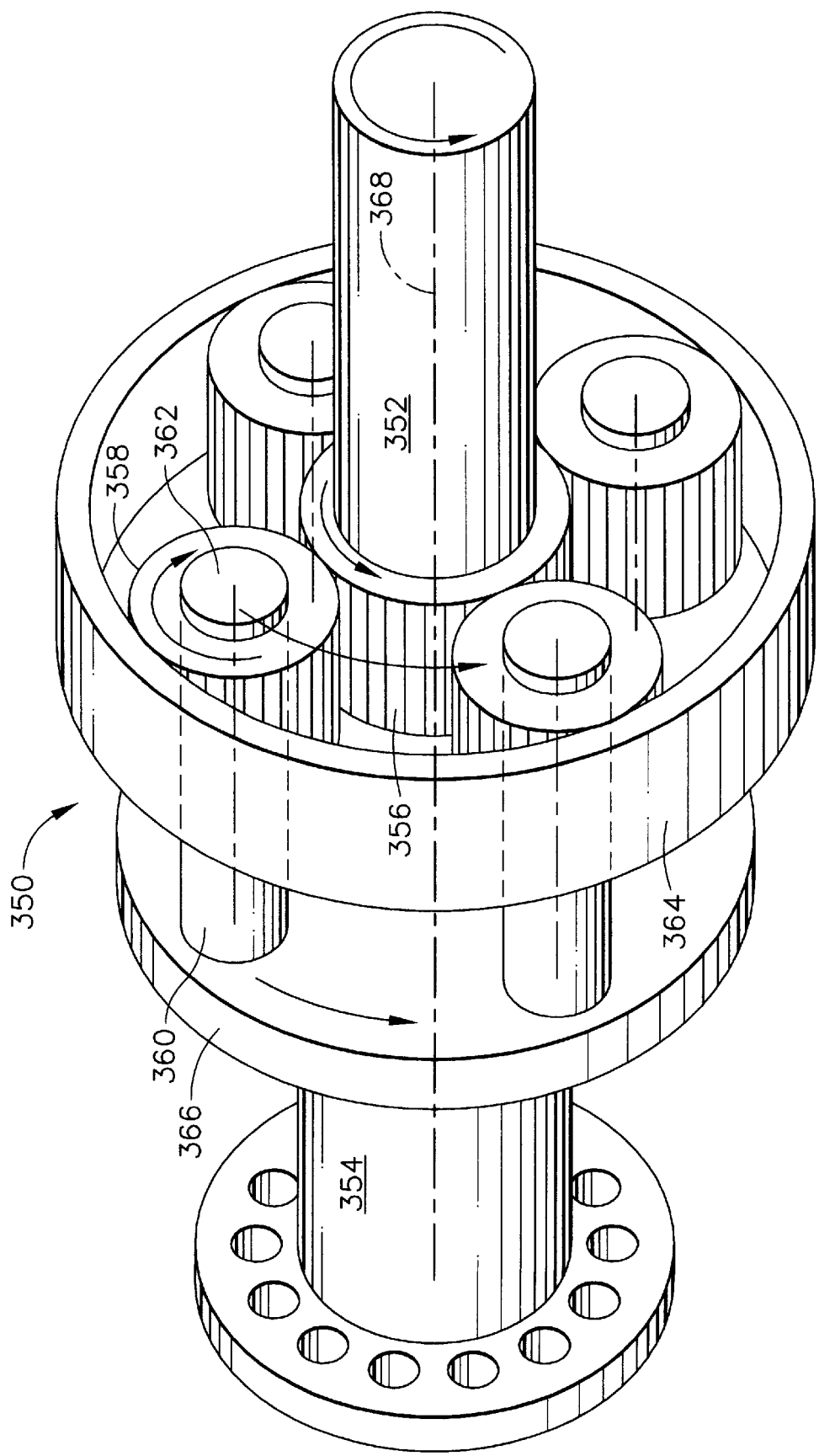
FIG. 4 is a schematic view of a planetary gear system.

FIG. 4 illustrates a gear assembly 350 that could be used, for example, in connection with engine 200 (i.e., as gear assembly 206). Gear assembly 350 is a planetary gear assembly that includes a first shaft 352 and a second shaft 354. Shaft 352 rotates in the same direction as shaft 354. For example, shaft 352 rotates counter-clockwise and shaft 354 also rotates counter-clockwise.

First shaft 352 is a high speed shaft and could be connected to a high pressure shaft in the turbine engine. Shaft 352 is also connected to a sun gear 356. Sun gear 356 is in contact with a plurality of planetary gears 358 that are substantially uniformly spaced around sun gear 356. Planetary gears 358 each include a spindle, or pin, 360 that extends from a center 362 of gears 358. Planetary gears 358 rotate in an opposite direction from the rotation of sun gear 356.

Gear assembly 350 further includes an annulus gear, or ring, 364 that is in contact with planetary gears 358. Annulus gear 364 is fixedly connected to a frame (not shown) of the turbine engine so that annulus gear 364 remains stationary with respect to the rotation of shafts 352 and 354. Spindles 360 are connected to a disk 366 that is fixedly connected to shaft 354. Since annulus gear 364 remains fixed with respect to shafts 352 and 354, planetary gears 358 rotate about their centers 362 and spindles 360 rotate about an axis 368 that extends through shafts 352 and 354. Thus, disk 366 rotates in the same direction as shafts 352 and 354 rotate.

Gear assembly 350 can achieve output ratios in the range from about 3:1 to about 11:1. The range can be varied by varying the size of annulus ring 364 and the size of sun gear 356. In addition, the number and size of planetary gears 358 in gear assembly 350 will vary depending on the desired ratio.

A turbine engine that includes a gear driven booster which is coupled to a high pressure shaft by a gear assembly will have a lower inlet temperature for the low pressure turbine, and a reduced number of booster and low pressure turbine stages. In addition, the low pressure shaft horse power is also reduced which reduces the torque on the low pressure shaft. Further, the fan is driven directly by the low pressure shaft which reduces the probability of a runaway low pressure turbine if the connection between the fan and the low pressure turbine is lost.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A turbine engine comprising:
   a first turbine;
   a booster located upstream of said first turbine;
   a first shaft including a first end portion and a second end portion, said shaft extending from said first turbine and connected to said first turbine at said first end portion;
   a first gear assembly connecting said booster to said first shaft at said second end portion; and
   a compressor upstream from said first turbine, said compressor connected to said first shaft.

2. A turbine engine in accordance with claim 1 further comprising a second shaft including a first end portion and a second end portion, said second shaft first end portion connected to said booster and said second shaft second end portion connected to said gear assembly.

3. A turbine engine in accordance with claim 1 further comprising a second turbine located downstream of said first turbine, wherein said first turbine is a high pressure turbine and said second turbine is a low pressure turbine.

4. A turbine engine in accordance with claim 3 further comprising:
   a fan; and
   a second shaft having a first end portion and a second end portion, said third shaft first end portion connected to said fan and said third shaft second end portion connected to said low pressure turbine.

5. A turbine engine in accordance with claim 1 further comprising an accessories drive connected to said first shaft by a second gear assembly.

6. A turbine engine in accordance with claim 5 wherein said second gear assembly is positioned between said first gear assembly and said first turbine.

7. A turbine engine in accordance with claim 1 wherein said booster rotates in a first direction and said first turbine rotates in a second, opposite direction.

8. A turbine engine in accordance with claim 1 further comprising:
   a first seal between said gear assembly and said first turbine, said first seal for preventing oil from entering said compressor; and
   a second seal positioned upstream of said gear assembly, said second seal for preventing oil from entering said booster.

9. A turbine engine in accordance with claim 1 wherein said booster comprises a high speed orthogonal booster including a plurality of rotor blades and a plurality of stator vanes.

10. A turbine engine in accordance with claim 1 wherein said gear assembly comprises a sun gear configured to rotate in a first direction, a plurality of planetary gears connected to said sun gear and configured to rotate in a second direction, and an annulus gear connected to said planetary gears and configured to rotate in said second direction.

11. A turbine engine in accordance with claim 10 further comprising a second shaft including a first end portion and a second end portion, said second shaft second end portion is connected to said annulus gear and said first shaft second end portion is connected to said sun gear.

12. A method for assembling a turbine engine, the turbine engine including a high pressure shaft connecting a high pressure turbine to a high pressure compressor, and a booster shaft connecting a booster to a gear assembly, said method comprising the steps of:

connecting the gear assembly to the high pressure shaft; and connecting the booster shaft to the gear assembly so that the booster shaft rotates at a different speed than the high pressure shaft.

13. A method in accordance with claim 12 wherein said high pressure turbine rotates in a first direction, said method of connecting the booster shaft includes the step of connecting the booster to rotate in a second direction which is opposite to the first direction.

14. A method in accordance with claim 12 wherein said high pressure turbine rotates in a first direction, said method of connecting the booster shaft includes the step of connecting the booster to rotate in the first direction.

15. A method in accordance with claim 12 wherein said method of connecting the booster shaft includes the step of connecting the booster to rotate at approximately half the speed of the high pressure turbine.

16. A method in accordance with claim 12 further comprising the steps of:

connecting a first seal to the high pressure shaft between the gear assembly and the high pressure turbine; and connecting a second seal to the booster shaft upstream of the high pressure turbine, wherein the seals are oil seals.

17. A method in accordance with claim 12 wherein the gear assembly includes a sun gear, a plurality of planetary gears configured to rotate about the sun gear, and an annulus gear configured to rotate about the planetary gears, said step of connecting the gear assembly to the high pressure shaft includes the step of connecting the sun gear to the high pressure shaft.

18. A method in accordance with claim 17 wherein said step of connecting the booster shaft to the gear assembly includes the step of connecting the annulus gear to the booster shaft.

19. A method in accordance with claim 12 wherein the planetary gears each include a spindle, said step of connecting the booster shaft to the gear assembly includes the step of connecting the planetary gear spindles to the booster shaft.

* * * * *